D. MACKINNON.

Pen.

No. 9,376. Reissued Sept. 14, 1880.

Attest:

R. F. Barnes.

L. W. Seely.

Inventor:

Duncan Mackinnon by Elec. Spear

Attorney.

UNITED STATES PATENT OFFICE.

DUNCAN MACKINNON, OF LUCKNOW, ONTARIO, CANADA.

PEN.

SPECIFICATION forming part of Reissued Letters Patent No. 9,376, dated September 14, 1880.

Original No. 226,618, dated April 20, 1880. Application for reissue filed July 21, 1880.

*To all whom it may concern:*

Be it known that I, DUNCAN MACKINNON, of Lucknow, in the county of Bruce, Province of Ontario, in the Dominion of Canada, have invented a new and useful Improvement in Writing-Pens; and I hereby declare the following to be a full, clear, and exact description of the same.

My invention is an improvement upon the ordinary writing-pen, and is designed to render the pen more durable, capable of holding more ink, of smoother writing without liability to blot or spatter, and without requiring constant and unequal pressure to induce a flow of ink.

Prior to my invention the common writing-pen had been made with flexible points slitted centrally, but with the two parts in contact, and depending upon the separation caused by pressure upon the paper for the flow of ink. Such pens have also depended solely upon the cohesion and adhesion of the ink to retain it upon the surface, the concave side of the pen, which is best adapted to hold the ink, being underneath when the pen was in use. The points of the common pens, being necessarily made more or less sharp, are also liable to catch and blot or spatter the ink. Constant pressure necessary to cause or increase the flow destroys, in part, the elasticity of the points, and causes them to remain apart even when not under pressure, thus rendering the pen speedily worthless.

For the purpose of obviating these evils my invention is made to consist of a pen (of any suitable metal) in general form similar to the ordinary writing-pen, but so formed at the point that it may be used with the concave side upward, and provided with a fine slot flaring upwardly, running from the point centrally into the body of the pen, said slot leaving slightly separated the two stiff ribs, the ends of which form the writing-point.

Figure 1:
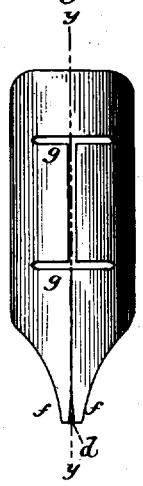
Figure 2:
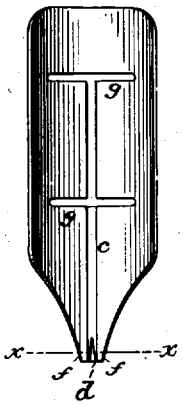
Figure 3:
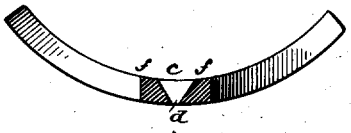
Figure 4:
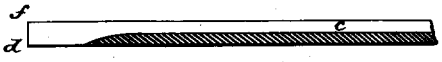

In the drawings, Figure 1 represents the convex or under side of my improved pen; Fig. 2, the concave or upper side. Fig. 3 represents a section on line *x x*, and Fig. 4 a section on *y y*.

In Figs. 1 and 2 is represented a pen of the common form, being a longitudinal section of a plain tube, the point being what is technically known as a "stub" point. As represented in Figs. 1 and 2 the pen is slitted centrally, so as to divide the point, as shown at *d*, into two nibs, *f f*, from the point upward, with a fine slit, which separates the halves of the point. This slit, though fine, is visible when the pen is held to the light, and, as the nibs are stiff, remains of uniform width when the pen is in use. It will be observed, however, that the narrow part of the slit is upon the convex side of the pen. Toward the concave side the walls of the slit flare outward, forming a broader passage-way or groove, *c*, for the flow of the ink. This passage-way may be made to increase slightly in width toward the body of the pen.

Transverse slots *g g*, connected by a longitudinal slot, serve in this, as in other pens, to retain the ink, and add to the capacity of the pen. Whether these be used or not, or of whatever form, the concave upper surface of the pen increases its retentive power, while the fine permanent slit, enlarged toward the ink-bearing surface, causes the ink to flow steadily in proper quantity to the paper. These stiff nibs, separated from contact by a slit communicating with a concave upper ink-holding surface, constitute, therefore, the distinguishing feature of my pen and give it the special advantages described.

I am aware that pens have been heretofore suggested and described with concave upper and convex lower surfaces, and I do not broadly claim such.

Having thus described my invention, what I claim as new, and desire to secure by Letters Patent, is—

1. A writing-pen formed of the longitudinal section of a plain tube, provided with open slots for retaining the ink and with stiff writing-points separated by a narrow open slit, and with a groove leading from the open slots to the point, said points being adapted for writing with the concave surface uppermost, all as set forth.

2. In a writing-pen having a concave upper and a convex lower surface and stiff writing-points adapted thereto, the thin slit between the points and flaring toward the concave or upper side, substantially as described.

3. The improved pen herein described, constructed with a point formed of two short nibs, *f f*, separated by a V-shaped slot, transverse and longitudinal slits or openings *g g* in the body, and central groove, *c*, extending from the slotted body to the point of the pen, all substantially as and for the purposes set forth.

In testimony whereof I have signed my name to this specification in the presence of two subscribing witnesses.

DUNCAN MACKINNON.

Witnesses:
ANGUS MACKINNON,
H. V. C. HART.